(12) United States Patent
Hatori

(10) Patent No.: US 8,854,479 B2
(45) Date of Patent: Oct. 7, 2014

(54) INFORMATION PROCESSING APPARATUS AND METHOD

(75) Inventor: Kenji Hatori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 13/206,152

(22) Filed: Aug. 9, 2011

(65) Prior Publication Data

US 2011/0292223 A1 Dec. 1, 2011

Related U.S. Application Data

(63) Continuation of application No. 12/896,048, filed on Oct. 1, 2010, now Pat. No. 8,013,893, which is a continuation of application No. 10/386,195, filed on Mar. 11, 2003, now Pat. No. 7,821,536.

(30) Foreign Application Priority Data

Mar. 12, 2002 (JP) .................................. 2002-067338

(51) Int. Cl.
*H04N 5/225* (2006.01)
*H04N 1/00* (2006.01)
*H04N 1/32* (2006.01)
*H04N 101/00* (2006.01)

(52) U.S. Cl.
CPC .... *H04N 1/32112* (2013.01); *H04N 2201/3264* (2013.01); *H04N 2101/00* (2013.01); *H04N 2201/3277* (2013.01); *H04N 2201/001* (2013.01); *H04N 1/00204* (2013.01); *H04N 1/00196* (2013.01); *H04N 2201/3212* (2013.01); *H04N 2201/3204* (2013.01)
USPC ................... 348/207.1; 348/207.99; 348/552; 348/222.1; 348/231.99

(58) Field of Classification Search
USPC ...................... 348/207.1, 207.99, 552, 222.1, 348/231.99–231.1, 373, 375; 396/310, 321
See application file for complete search history.

(56) References Cited

U.S. PATENT DOCUMENTS 7,019,778 B1 * 3/2006 Prabhu et al. ............ 348/333.01

* cited by examiner

*Primary Examiner* — Yogesh Aggarwal
(74) *Attorney, Agent, or Firm* — Cowan, Liebowitz & Latman, P.C.

(57) ABSTRACT

A personal computer holds data of a plurality of types in a content storage unit and transfers items of data related across the types of data to a digital camera as group data. The digital camera stores the group data, which is received from the personal computer, in a content memory unit.

54 Claims, 12 Drawing Sheets

F I G. 7

| THEME | NO.1 | NO.2 |
|---|---|---|
| RELEASE SOUND | NO.1 | NO.2 |
| START-UP SOUND | NO.1 | NO.2 |
| SELF-TIMER SOUND | NO.1 | NO.2 |
| OPERATION SOUND | NO.1 | NO.2 |
| START-UP IMAGE | NO.1 | NO.2 |

| | RELEASE SOUND | | START-UP SOUND | | START-UP IMAGE | | SELF-TIMER SOUND | | OPERATION SOUND | |
|---|---|---|---|---|---|---|---|---|---|---|
| NO.1 | Animal_RS01.wav | ○ | Animal_SS01.wav | ○ | Animal_SI01.wav | ○ | Animal_TS01.wav | ○ | Animal_OS01.wav | ○ |
| NO.2 | Camera_RS01.wav | | Car_SS01.wav | | Plane_SI01.wav | | Baby_TS01.wav | | SF_OS01.wav | |

901

INFORMATION PROCESSING APPARATUS AND METHOD

CROSS-REFERENCE TO RELATED APPLICATION

This application is a continuation of application Ser. No. 12/896,048, filed Oct. 1, 2010 now U.S. Pat. No. 8,013,893, which is a continuation of application Ser. No. 10/386,195, filed Mar. 11, 2003, now U.S. Pat. No. 7,821,536, the entire disclosures of which are hereby incorporated by reference.

FIELD OF THE INVENTION

This invention relates to an information processing apparatus, a data storage device, a data transfer system and a data transfer method, program and recording medium for alleviating the burden involved in designating data to be transferred.

BACKGROUND OF THE INVENTION

A system available in the prior art for the purpose of customizing the state of an electronic device involves writing several types of data to the electronic device so that the device will behave in accordance with this data. For example, if the device is a conventional digital camera, the sound of the shutter release, the sound of a self-timer or the start-up image presented by the device can be rewritten from a personal computer.

In the prior art, first the sound of the shutter release is set in the camera and then the sound of the self-timer is set. Thus, it is necessary to set data in the camera on a type by type basis. Consequently, if a release sound and a self-timer sound have an animal as their theme, for example, it is necessary for the user to perform separate camera-write operations.

SUMMARY OF THE INVENTION

Accordingly, an object of the present invention is to provide an information processing apparatus, a data storage device, a data transfer system and a data transfer method, program and recording medium for automatically recognizing data in accordance with a certain theme, from data such as that representing a shutter-release sound or self-timer sound, as a group, and having a user specify this group to thereby enable the data in accordance with the theme to be written to an electronic device at one time.

According to a first mode of the present invention, the foregoing object is attained by providing an information processing apparatus comprising:

(A) a grouping unit for grouping stored data of a plurality of types relating to a camera based upon prescribed information concerning the data; and (B) a transfer unit for transferring the data, which has been grouped by the grouping unit, to the camera.

Preferably, the apparatus according to the first mode is such that the grouping unit designates a group name, thereby grouping data corresponding to this group name from the data of the plurality of types.

Preferably, the apparatus according to the first mode is such that the grouping unit selects a desired group name from a plurality of displayed group names, thereby grouping data corresponding to the selected group name from the data of the plurality of types.

Preferably, the apparatus according to the first mode is such that the data of the plurality of types includes at least one among audio data relating to a shutter-release sound, audio data relating to a start-up sound, audio data relating to an operation sound, audio data relating to a self-timer sound, and image data relating to a start-up image.

Preferably, the apparatus according to the first mode further comprises a reproducing unit for successively reproducing data that has been grouped by the grouping unit.

According to a second mode of the present invention, the foregoing object is attained by providing a method transferring data to a camera, comprising: a grouping step of grouping stored data of a plurality of types relating to a camera based upon prescribed information concerning the data; and a transferring step of transferring the grouped data to the camera.

Preferably, the method according to the second mode is such that the grouping step designates a group name, thereby grouping data corresponding to this group name from the data of the plurality of types.

Preferably, the method according to the second mode is such that the grouping step selects a desired group name from a plurality of displayed group names, thereby grouping data corresponding to the selected group name from the data of the plurality of types.

Preferably, the method according to the second mode is such that the data of the plurality of types includes at least one among audio data relating to a shutter-release sound, audio data relating to a start-up sound, audio data relating to an operation sound, audio data relating to a self-timer sound, and image data relating to a start-up image.

Preferably, the method according to the second mode further comprises a reproducing step of successively reproducing data that has been grouped.

According to a third mode of the present invention, the foregoing object is attained by providing a computer control program for transferring camera-related data to a camera, the program containing code for implementing the following steps: a grouping step of grouping stored data of a plurality of types relating to a camera based upon prescribed information concerning the data; and a transferring step of transferring the grouped data to the camera.

Preferably, the program according to the third mode is such that the grouping step designates a group name, thereby grouping data corresponding to this group name from the data of the plurality of types.

Preferably, the program according to the third mode is such that the grouping step selects a desired group name from a plurality of displayed group names, thereby grouping data corresponding to the selected group name from the data of the plurality of types.

Preferably, the program according to the third mode is such that the data of the plurality of types includes at least one among audio data relating to a shutter-release sound, audio data relating to a start-up sound, audio data relating to an operation sound, audio data relating to a self-timer sound, and image data relating to a start-up image.

Preferably, the program according to the third mode further comprises a reproducing step of successively reproducing data that has been grouped.

Also provided is a storage medium storing the computer control program according to the third mode of the present invention set forth above.

According to a fourth mode of the present invention, the foregoing object is attained by providing an information processing apparatus comprising:

(A) a storage unit for storing grouped camera-related data of a plurality of types transferred from outside the apparatus; and (B) a selecting unit for collectively selecting the grouped data, which has been stored in the storage unit, as data used by a camera.

Preferably, the apparatus according to the fourth mode is such that the selecting unit designates a group name, thereby collectively selecting the grouped data corresponding to this group name.

Preferably, the apparatus according to the fourth mode is such that the selecting unit selects a desired group name from a plurality of displayed group names, thereby collectively selecting the grouped data corresponding to the selected group name.

Preferably, the apparatus according to the fourth mode is such that the data of the plurality of types includes at least one among audio data relating to a shutter-release sound, audio data relating to a start-up sound, audio data relating to an operation sound, audio data relating to a self-timer sound, and image data relating to a start-up image.

Preferably, the apparatus according to the fourth mode further comprises a reproducing unit for successively reproducing the grouped data selected by the selecting unit.

Preferably, the apparatus according to the fourth mode includes a camera.

According to a fifth mode of the present invention, the foregoing object is attained by providing a camera control method comprising a selecting step of collectively selecting grouped camera-related data of a plurality of types, which have been transferred from outside and stored in a storage unit, as data used by a camera.

Preferably, the method according to the fifth mode is such that the selecting step designates a group name, thereby collectively selecting the grouped data corresponding to this group name.

Preferably, the method according to the fifth mode is such that the selecting step selects a desired group name from a plurality of displayed group names, thereby collectively selecting the grouped data corresponding to the selected group name.

Preferably, the method according to the fifth mode is such that the data of the plurality of types includes at least one among audio data relating to a shutter-release sound, audio data relating to a start-up sound, audio data relating to an operation sound, audio data relating to a self-timer sound, and image data relating to a start-up image.

Preferably, the method according to the fifth mode further comprises a reproducing step of successively reproducing the grouped data selected.

According to a sixth mode of the present invention, the foregoing object is attained by providing a computer control program for control of a camera, comprising a selecting step of collectively selecting grouped camera-related data of a plurality of types, which have been transferred from outside and stored in a storage unit, as data used by a camera.

Preferably, the program according to the sixth mode is such that the selecting step designates a group name, thereby collectively selecting the grouped data corresponding to this group name.

Preferably, the program according to the sixth mode is such that the selecting step selects a desired group name from a plurality of displayed group names, thereby collectively selecting the grouped data corresponding to the selected group name.

Preferably, the program according to the sixth mode is such that the data of the plurality of types includes at least one among audio data relating to a shutter-release sound, audio data relating to a start-up sound, audio data relating to an operation sound, audio data relating to a self-timer sound, and image data relating to a start-up image.

Preferably, the program according to the sixth mode further comprises a reproducing step of successively reproducing the grouped data selected.

Also provided is a storage medium storing the computer control program according to the sixth mode of the present invention set forth above.

Thus, in accordance with the present invention as set forth above, group data comprising data related across types of data is transferred. As a result, it is no longer necessary for data that is to be transferred to be designated individually at the device that is the transfer source, as in the prior art, and it is possible to alleviate the burden involved in the data setting operation at the destination device.

Other objects and advantages besides those discussed above will be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to claims which follow the description for determining the scope of the invention.

BRIEF DESCRIPTION OF THE DRAWINGS

FIG. 7 is a diagram illustrating an example of a screen displayed by a personal computer when content is selected according to this embodiment;

FIG. 9 is a diagram illustrating what is stored in a content storage unit according to this embodiment;

DETAILED DESCRIPTION OF THE PREFERRED EMBODIMENT

A preferred embodiment of the present invention will described in detail with reference to the accompanying drawings.

Figure 1:
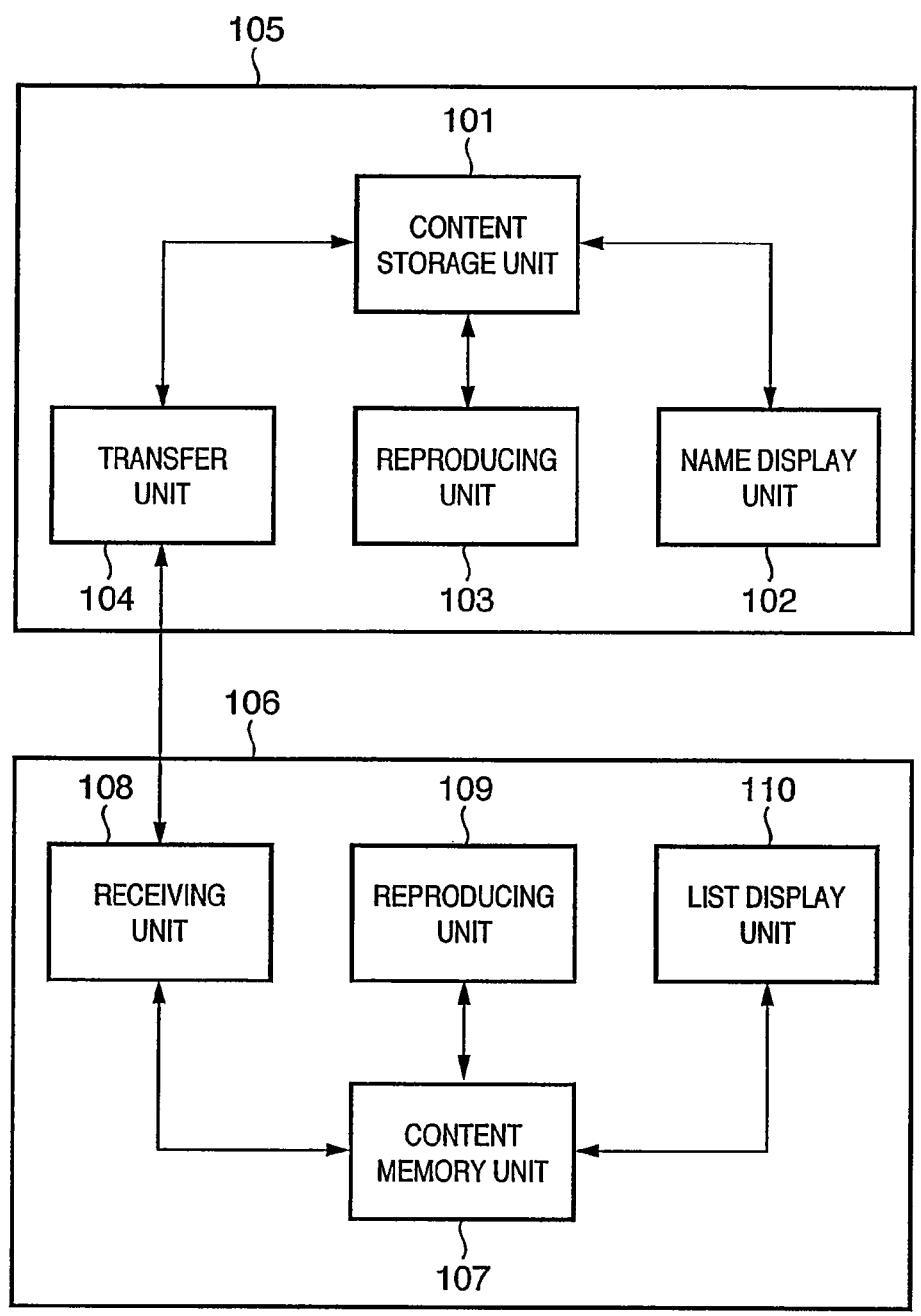
FIG. 1 is a block diagram illustrating an example of the configuration of a data transfer system according to an embodiment of the present invention.

FIG. 1 is a block diagram illustrating an example of the configuration of a data transfer system according to an embodiment of the present invention.

As shown in FIG. 1, the system includes a personal computer 105 already well known in the art. The personal computer 105 has a content storage unit 101 for storing files such as for a start-up sound, shutter-release sound, operation sound, self-timer sound and start-up image that are set in a digital camera. The content storage unit 101 can be implemented in the form of a hard disk. This data that can be stored in the camera, such as start-up sound, release sound, operation sound, self-timer sound and start-up image, shall be referred to as "content" below. In this embodiment, it is assumed for the sake of convenience that there are five types of content. However, the number of types may be larger of smaller than five.

Figure 2:
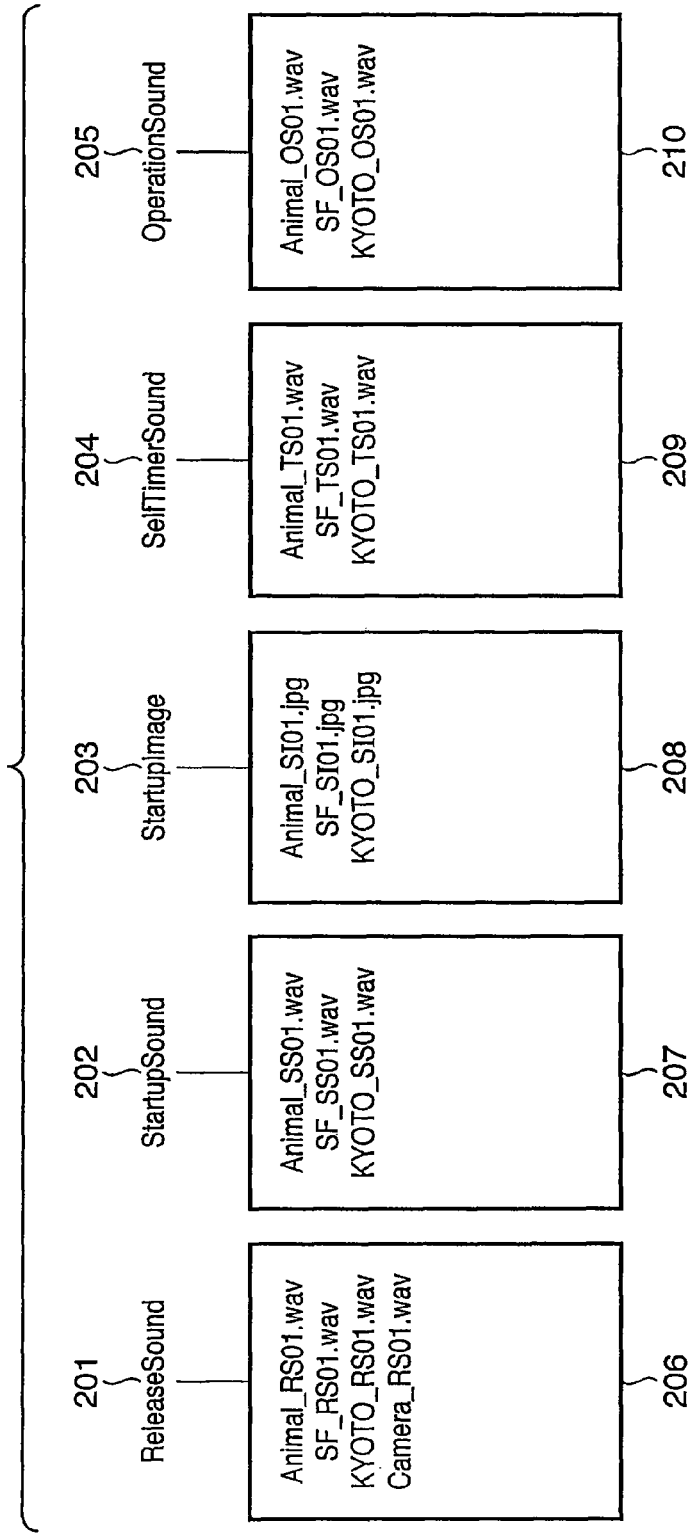
FIG. 2 is a diagram illustrating what is stored in a content storage unit according to this embodiment.

FIG. 2 is a diagram illustrating what is stored in the content storage unit according to this embodiment. Numerals 201 to 205 denote folders in which content is stored according to category. Here the folders 201 to 205 store release sound, start-up sound, start-up image, self-timer sound and operation sound, respectively. The release sound is a sound reproduced when the shutter button is pressed; the start-up sound is a sound reproduced when the camera power supply is turned on; the start-up image is an image displayed when the camera power supply is turned on; the self-timer sound is a sound reproduced from the moment the shutter button is pressed in a self-timed photography mode to the moment the shutter is actually released; and the operation sound is a sound reproduced when buttons on the camera are operated.

Numerals 206 to 210 in FIG. 2 denote files of stored content. The name of each file is determined by the following rule: The file extension represents the format of the data. Audio in the WAVE format has ".wav" has its extension, and an image in the JPEG format has ".jpg" as its extension. The segment of the file name ahead of the extension comprises two portions delimited from each other by " ". The first portion is any identifier that represents the nature of the data. For example, a name such as "Animal" can be assigned to data that has an animal as its theme. The second portion represents the type of data. For example, if the data is that of the shutter release sound, then a name such as "RS01" is assigned.

The personal computer 105 further includes a reproducing unit 103 for reproducing content at the personal computer. The reproducing unit 103 is capable of reproducing the release sound at the personal computer and of displaying the start-up image. Also included in the personal computer 105 are name display unit 102 for displaying file names and identifiers of content on a display unit, and transfer unit 104 for transferring content to a digital camera 106. A content memory unit 107 stores content that has been transferred from the personal computer 105.

FIG. 9 is a diagram illustrating an example of what is stored in the content memory unit 107. According to this embodiment, it is assumed that the content memory unit 107 is capable of storing two types of data for each of the five types of content. In FIG. 9, No. 1 and No. 2 represent storage areas for two types of data. FIG. 9 shows the manner in which data indicated by file names has been stored in the No. 1 and No. 2 areas of content. A flag 901 in FIG. 9 indicates which data of areas Nos. 1 and 2 has actually been set in the camera. FIG. 9 indicates that the data of area No. 1 has been set for all five types of content.

A receiving unit 108 receives content transferred from the personal computer 105 and records this content in the content memory unit 107.

A reproducing unit 109 reproduces content, which has been stored in the content memory unit 107, at the digital camera.

A list display unit 110 displays a list of content, which has been stored in the content memory unit 107, on a liquid crystal display device or the like provided on the digital camera.

The operation of the data transfer system according to this embodiment will now be described.

Figure 3:
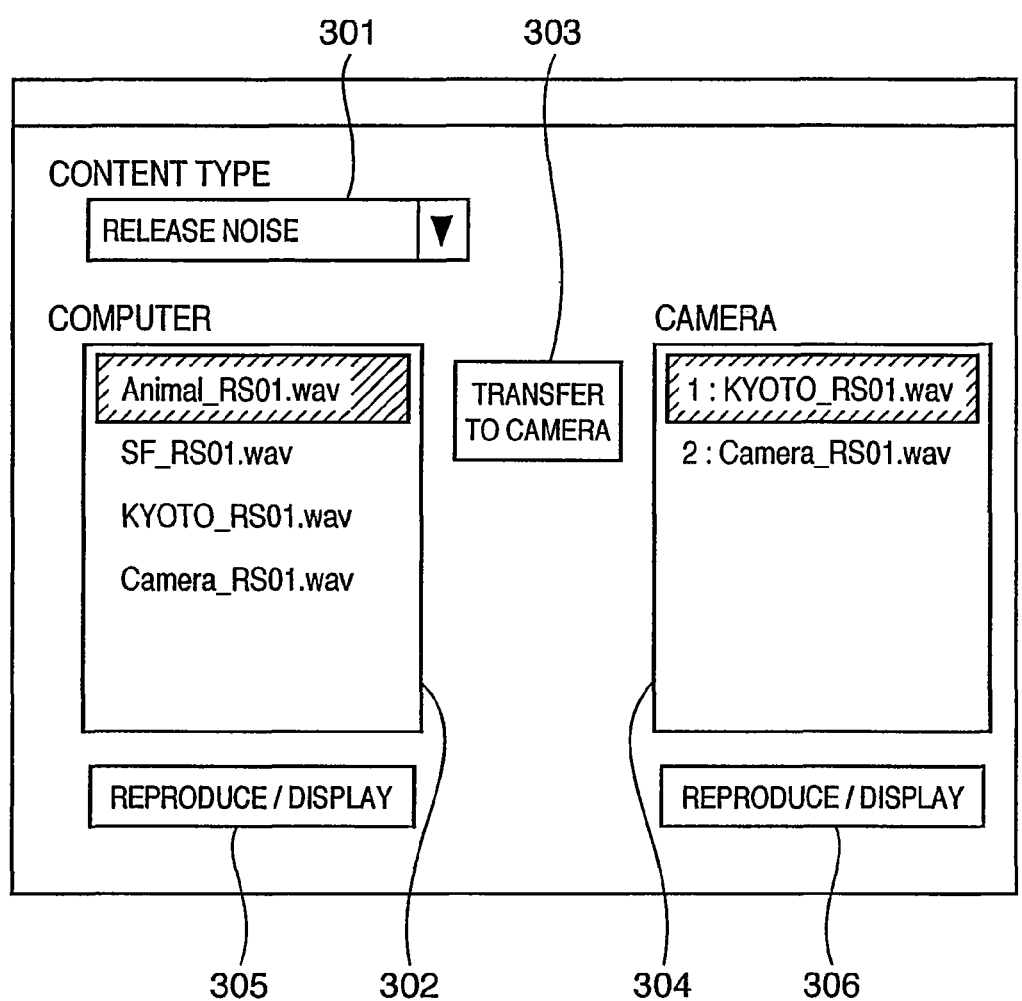
FIG. 3 is a diagram illustrating an example of a screen displayed by a name display unit according to this embodiment.

FIG. 3 is a diagram illustrating an example of a screen displayed by the name display unit. The screen includes a list box 301 for selecting the type of content displayed. FIG. 3 illustrates that the release sound has been selected. As will be described later, this screen makes it possible to select a "theme" in addition to individual content such as the shutter release sound. If "THEME" is selected, the five types of content mentioned above can be set collectively in the camera at one time.

The screen further includes an area 302 for displaying file names contained in the content selected. In the case of FIG. 3, the files contained in the Release Sound folder of FIG. 2 are being displayed. An area 304 is for displaying the file names of content that have been stored in the camera.

Two files per item of content can be stored in the camera. In this embodiment, these two files are distinguished from each other by assigning them numbers "1" and "2". FIG. 3 shows that files "KYOTO_RS01.wav" and "Camera_RS01.wav" have already been stored in the camera as Nos. 1 and 2, respectively.

The screen further includes a button 303 for transferring content selected in area 302 to the selected number in the camera. If this button is clicked, the selected content is transferred to the content memory unit 107 of the digital camera by the transfer unit 104. FIG. 3 shows that "Animal_RS01.wav" will be stored at No. 1 in the camera if button 303 is clicked.

Figure 8:
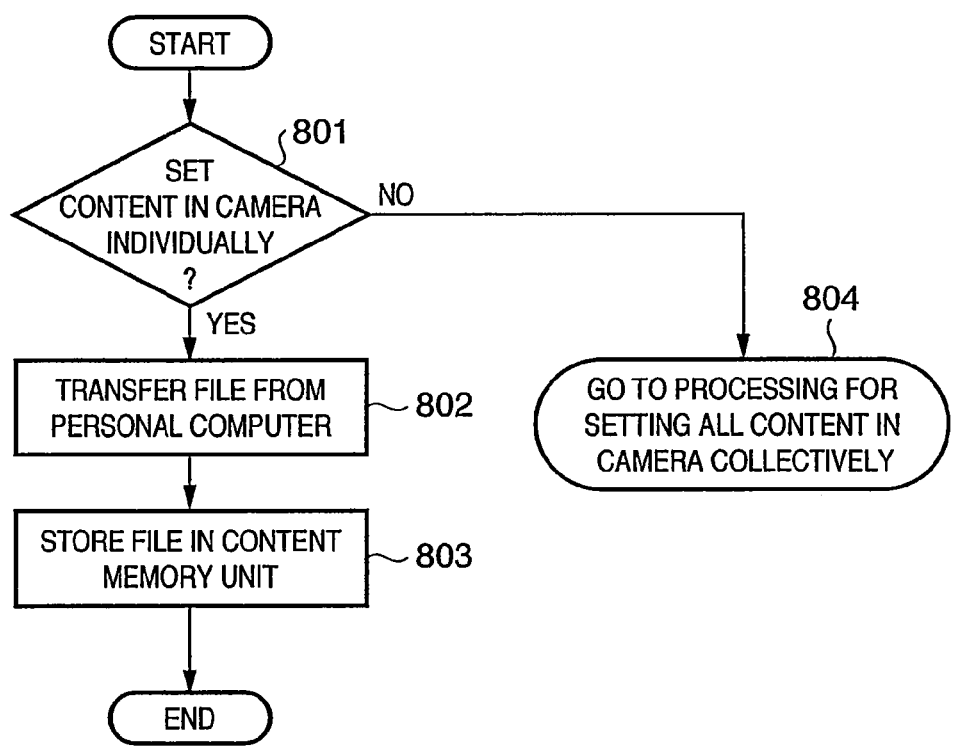
FIG. 8 is a flowchart illustrating the flow of operation when content is transferred from a personal computer to a digital still camera according to this embodiment.

The above operation will be described with reference to the flowchart of FIG. 8.

First, at step 801, the personal computer selects either to set content such as the release sound in the camera individually or to set the five types of content in the camera collectively. Control proceeds to step 802 if individual content is to be set in the camera, as in a case where, e.g., the release sound has been selected in area 301 in FIG. 3. Processing in a case where all content is to be set in the camera collectively will be described later. At step 802, a file that has been selected in area 302 of FIG. 3 is read out of the content storage unit 101 and transferred to the receiving unit 108 by the transfer unit 104. Next, the receiving unit 108 records the transferred file in the content memory unit 107 at step 803. At this time the file is recorded in an area of the content memory unit 107 that corresponds to the number (No. 1 in FIG. 3) designated in area 304 of FIG. 3. In the example of FIG. 3, Animal_RS01.wav is written in the No. 1 area of the shutter release sound.

A "REPRODUCE/DISPLAY" button will now be described.

Figure 11:
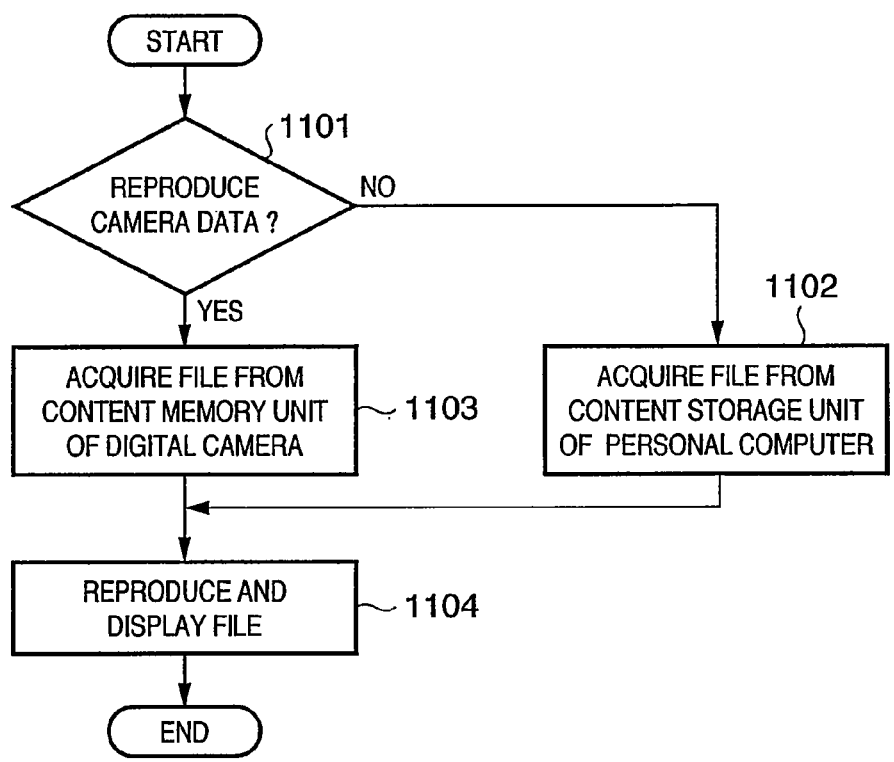
FIG. 11 is a flowchart illustrating the flow of a reproducing and display operation by a personal computer according to this embodiment.

The screen further includes a button 305 for reproducing/displaying the data selected in area 302, and a button 306 for reproducing/displaying the data selected in area 304. Operation when the buttons 305, 306 are clicked will be described with reference to the flowchart of FIG. 11.

First, at step 1101, whether the data in the camera or the data in the PC is to be reproduced is discriminated. If the "REPRODUCE/DISPLAY" button 305 has been clicked, the PC data is reproduced and therefore the data to be reproduced is acquired from the content storage unit 101 at step 1102. If the "REPRODUCE/DISPLAY" button 306 has been clicked, the data in the digital camera is reproduced and therefore the data to be reproduced is acquired from the content memory unit 107 at step 1103. The acquired data is reproduced and displayed at step 1104.

Operation in a case where the release sound, operation sound, start-up sound, start-up image and self-timer sound are set in the camera collectively at one time will be described next. An example of operation on the side of the personal computer will be described first with reference to FIG. 4.

Figure 5:
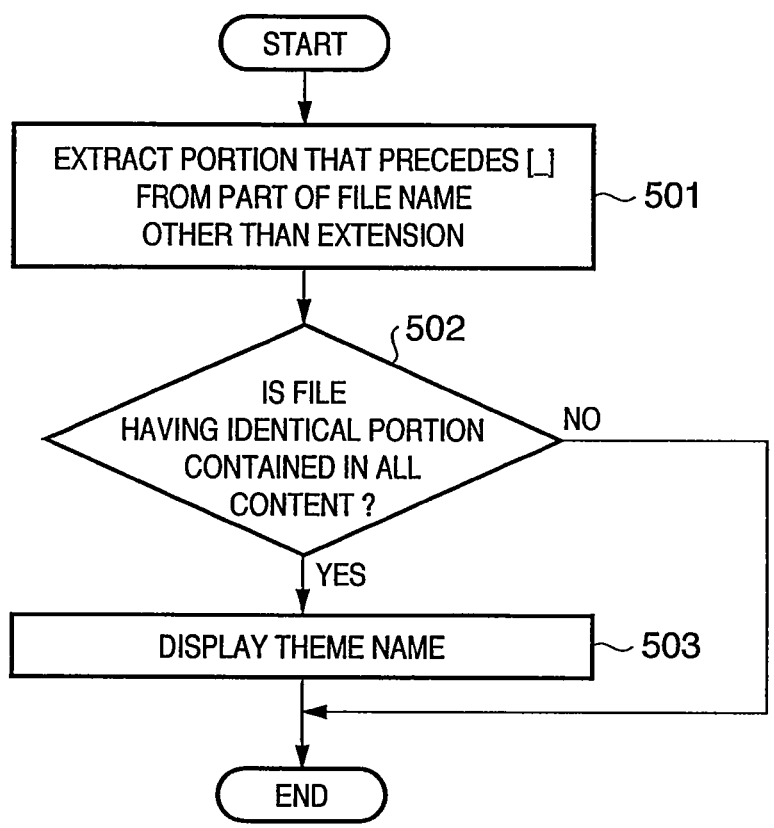
FIG. 5 is a flowchart illustrating the flow of operation of a personal computer according to this embodiment.

If "THEME" is selected in an area 401, the name display unit determines whether data that has been created based upon a certain theme is contained commonly in all folders of content. This determination can be made based upon the file naming rule described above. The procedure will be described with reference to FIG. 5.

First, at step 501, the personal computer extracts the portion that precedes the "_" delimiter from the part of the file name that excludes the extension. Next, at step 502, the personal computer determines whether a file having the same portion is contained in all content. If files for which this portion is identical exist, then this portion is displayed in area 302 of FIG. 3 at step 503. If FIG. 2 is taken as an example, all of the folders contain files that start with "Animal", "SF" and "KYOTO" and therefore these three are being displayed in area 402 in FIG. 4. The file starting with "Camera" is contained only in the release-sound folder and therefore is not recognized as a theme.

Alternatively, in another embodiment, it is also possible to adopt an arrangement in which a theme name is written in the header of each file, the name display unit acquires a theme name from the header of a file and, if this theme name exists commonly in all folders, then the name display unit displays the theme name.

Figure 4:
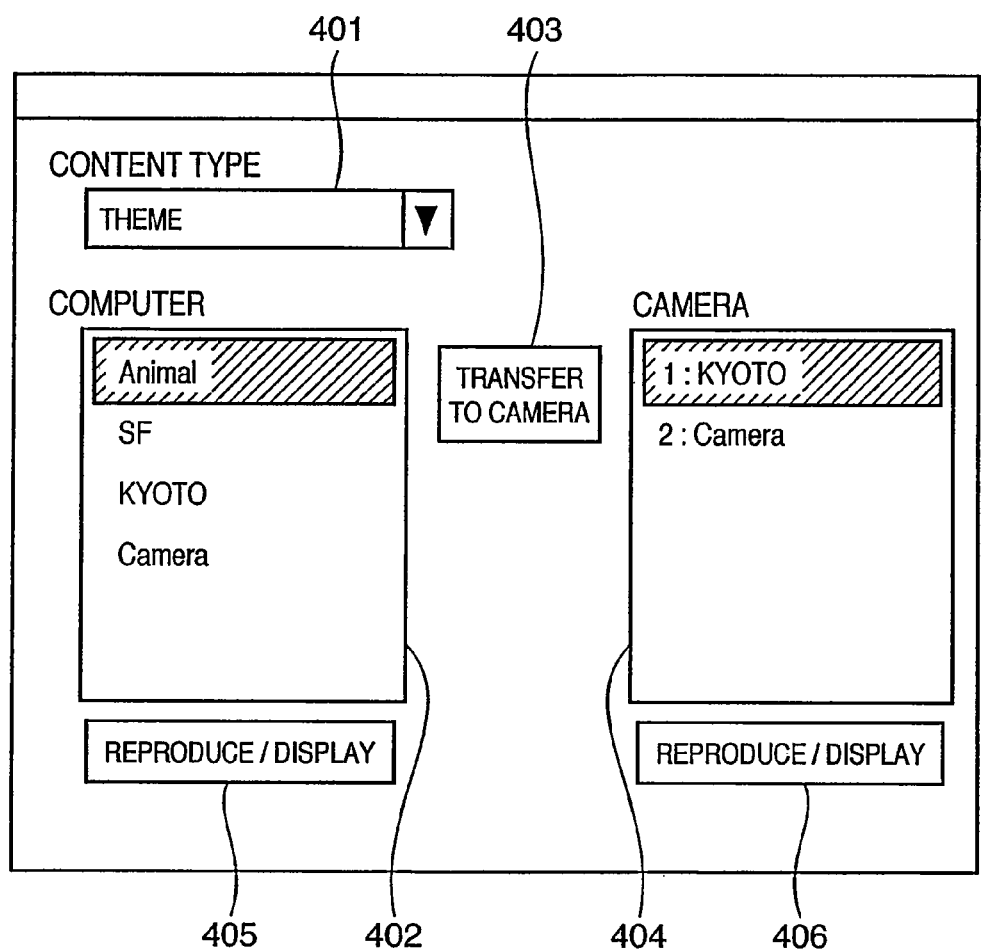
FIG. 4 is a diagram illustrating another example of a screen displayed by a name display unit according to this embodiment.

By a similar method, the theme names of content that has been stored in the content memory unit 107 within the digital camera are displayed in area 404 in FIG. 4. If a file of content has been stored in the camera is not in accordance with the theme, then the theme name is not displayed and, e.g., "1. NOT SET" is displayed instead.

If a theme name is selected from area 402 in FIG. 4, the number of a content item in the same is selected from area 404 and the "TRANSFER TO CAMERA" button 403 is clicked, five types of data included in this theme are transferred to the content memory unit 107 of the digital camera by the transfer unit 104 all at one time. This operation will be described with reference to the flowchart of FIG. 10.

Figure 10:
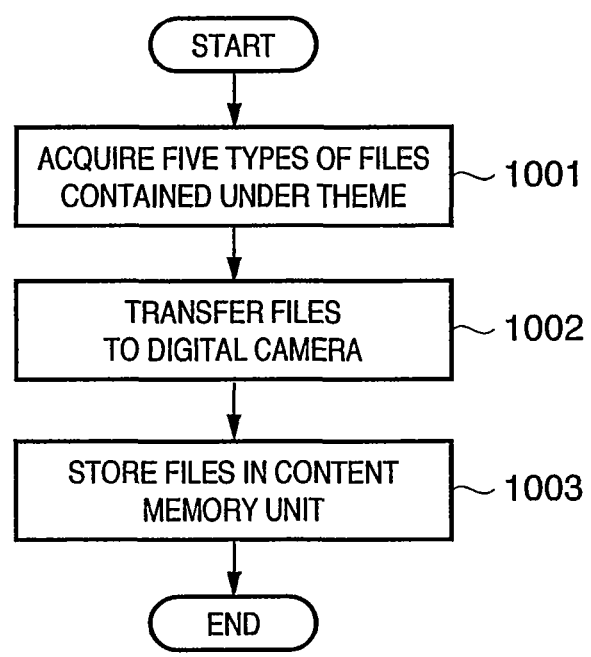
FIG. 10 is a flowchart illustrating the flow of operation when content is transferred from a personal computer to a digital still camera according to this embodiment.

At step 1001 in FIG. 10, the transfer unit 104 acquires the five types of files contained under the theme name from the content storage unit 101. The transfer unit 104 transfers these files to the receiving unit 108 at step 1002, and the receiving unit 108 records the transferred files in the content memory unit 107 at step 1003. At this time the files are recorded in an area of the content memory unit 107 that corresponds to the number (No. 1 in FIG. 4) designated in area 404 of FIG. 4.

If the "REPRODUCE/DISPLAY" button 405 or 406 is clicked, the five types of data included in the theme are reproduced one after another by the reproducing unit 103.

Figure 6:
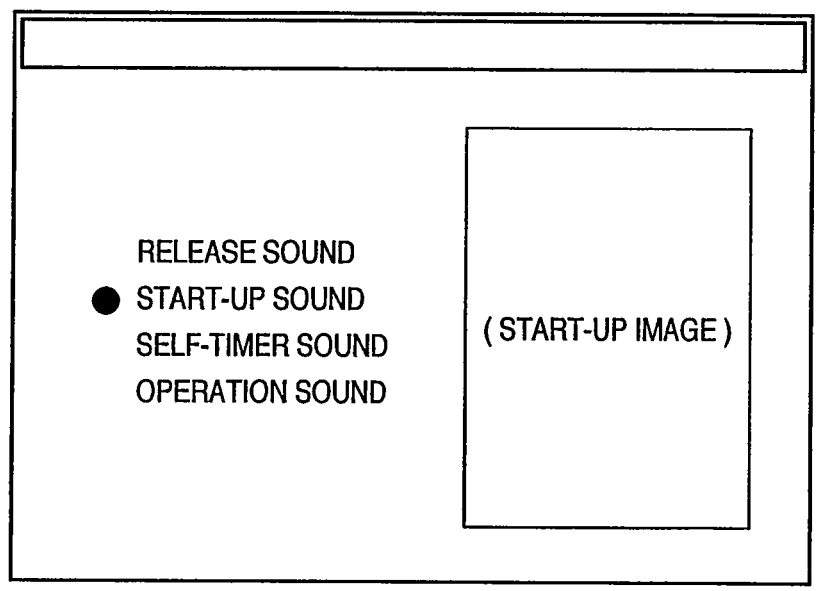
FIG. 6 is a diagram illustrating an example of a screen display for when a personal computer reproduces content according to this embodiment.

The screen shown in FIG. 6 is displayed during reproduction. The right side of the screen is an area that displays the start-up image, and the left side of the screen indicates the order in which the remaining items of content will be reproduced. A mark (the black circle shown in FIG. 6) is displayed at the type of audio being reproduced. This function can be implemented by an operation similar to that indicated by the flowchart of FIG. 11.

The operation of the digital camera 106 will be described next. In this embodiment, two types each of the release sound, start-up sound, self-timer sound, operation sound and start-up image can be stored in the camera and the user can select which of these types to use. This can be implemented employing a user interface of the kind shown in FIG. 7, by way of example. FIG. 7 is an example of a screen displayed on a liquid crystal display device of a digital camera. The list display unit 110 presents this display. Types of content are represented at 701 in FIG. 7. By using an operating member such as button or the like on the digital camera to toggle between "1" and "2", the user first selects type of content to be set. The two types of data possessed by each item of content are represented at 702 in FIG. 7. The user selects either No. 1 or No. 2 using the operating member on the camera. As a result, by selecting, e.g., "RELEASE SOUND" in area 701 and No. 1 in area 702, the user sets the sound at No. 1 as the release sound. At this time the selected release sound is reproduced by the reproducing unit of the digital camera. In a case where the start-up image has been selected, this image is displayed on the liquid crystal screen of the digital camera by the reproducing unit 109. If "THEME" has been selected in area 701 and No. 1 or No. 2 has been selected in area 702, the five types of content (release sound, start-up sound, self-timer sound, operation sound and start-up image) are all set to No. 1 or No. 2. At this time, No. 1 of the start-up image is displayed on the liquid crystal screen of the digital camera by the reproducing unit 109 and, at the same time, the release sound, start-up sound, self-timer sound and operation sound are reproduced one after the other.

The above operation will be described with reference to the flowchart of FIG. 12.

Figure 12:
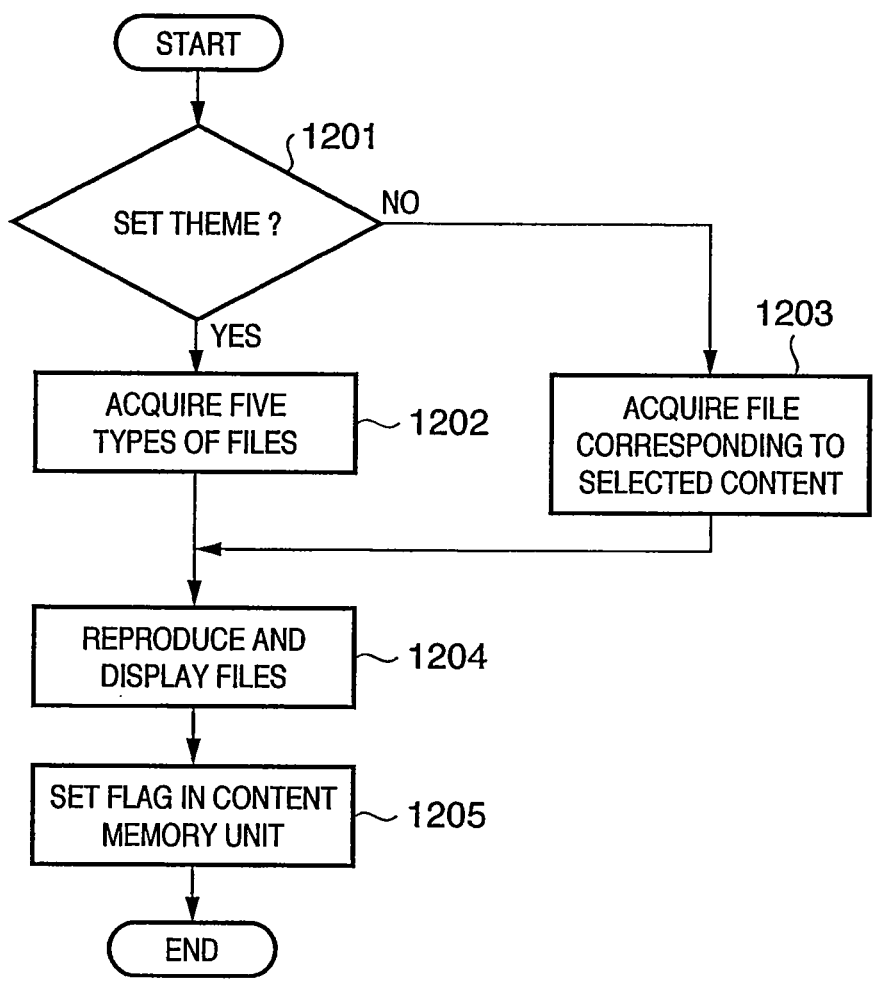
FIG. 12 is a flowchart illustrating the flow of operation of a digital camera according to this embodiment.

First, at step 1201 in FIG. 12, the digital camera discriminates whether a theme has been selected in area 701 of FIG. 7. If a theme has been selected, the digital camera acquires the data of each type of content corresponding to the number selected in area 702 of FIG. 7 from the content storage unit at step 1202. If content (e.g., the release sound) without a theme has been selected in area 701 of FIG. 7, the data corresponding to the number selected in area 702 of FIG. 7 is acquired from the content storage unit at step 1203. Next, at step 1204, the acquired data is reproduced and displayed by the reproducing unit 109. This is followed by step 1205, at which a flag is set in the content memory unit in order to register the acquired data as the camera release sound. More specifically, the flag indicated at 901 in FIG. 8 is set. As a result, the data is registered as the release sound, etc., of the digital camera.

When power supply of the digital camera is turned on, the currently selected start-up sound and start-up image are read out of the content memory unit 107, the start-up sound is reproduced from a speaker in the digital camera and the start-up image is displayed on the display device of the digital camera. Further, if the shutter button is pressed, the current release sound is read out of the content memory unit 107 and reproduced from the speaker. If an operation button on the digital camera is pressed, current operation sound is read out of the content memory unit 107 and reproduced from the speaker. If photography using the self timer is performed, the current self-timer sound is read out of the content memory unit 107 and the self-timer sound is reproduced from the moment the shutter is pressed to the moment the shutter is released.

Thus, in accordance with the present embodiment, if a plurality of types of related data are written to a peripheral device, the data can be written by being designated at one time by recognizing the related data automatically. This simplifies and reduces operations performed by the user.

It goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment, and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

The present invention is not limited to the above embodiments and various changes and modifications can be made within the spirit and scope of the present invention. Therefore, to apprise the public of the scope of the present invention, the following claims are made.

What is claimed is:

1. An information processing apparatus comprising:
   a first storage unit that stores first image data related to a first theme;
   a communication unit that communicates with an external device including a camera, wherein the external device includes a second storage unit that stores second image data related to a second theme; and
   a control unit that (a) causes the information processing apparatus to detect the second image data stored in the second storage unit, and (b) causes the information processing apparatus to display, on a same display screen, first information corresponding to the first image data stored in the first storage unit, second information corresponding to the second image data stored in the second storage unit, and a button for requesting the information processing apparatus to transmit the first image data stored in the first storage unit to the external device,
   wherein the first image data stored in the first storage unit is stored in the second storage unit, instead of the second image data stored in the second storage unit, if the button displayed on the same screen is operated.

2. The information processing apparatus according to claim 1, wherein the control unit causes the information processing apparatus to display, on the same screen, another button for requesting the information processing apparatus to display an image corresponding to the second image data stored in the second storage unit.

3. An information processing apparatus comprising:
   a first storage unit that stores first image data;
   a communication unit that communicates with an image capture device, wherein the image capture device includes a second storage unit that stores second image data; and
   a control unit that causes the information processing apparatus to display, on a same display screen, first information corresponding to the first image data stored in the first storage unit, second information corresponding to the second image data stored in the second storage unit, and a button for requesting the information processing apparatus to transmit the first image data stored in the first storage unit to the image capture device,
   wherein the first image data stored in the first storage unit is stored in the second storage unit, instead of the second image data stored in the second storage unit, if the button displayed on the same screen is operated.

4. The information processing apparatus according to claim 3, wherein the control unit causes the information processing apparatus to display, on the same screen, another button for requesting the information processing apparatus to display an image corresponding to the second image data stored in the second storage unit.

5. The information processing apparatus according to claim 3, wherein the first image data is related to a first theme, and the second image data is related to a second theme.

6. The information processing apparatus according to claim 3, wherein the first image data includes a start-up image, and the second image data includes a start-up image.

7. The information processing apparatus according to claim 3, wherein the image capture device includes a camera.

8. An information processing apparatus comprising:
   a first storage unit that stores first image data related to a first theme;
   a communication unit that communicates with an image capture device, wherein the image capture device includes a second storage unit that stores second image data related to a second theme; and
   a control unit that causes the information processing apparatus to display, on a same display screen, first information corresponding to the first theme, second information corresponding to the second theme, and a button for requesting the information processing apparatus to transmit the first image data related to the first theme to the image capture device,
   wherein the first image data stored in the first storage unit is stored in the second storage unit, instead of the second image data stored in the second storage unit, if the button displayed on the same screen is operated.

9. The information processing apparatus according to claim 8, wherein the control unit causes the information processing apparatus to display, on the same screen, another button for requesting the information processing apparatus to display an image corresponding to the second image data stored in the second storage unit.

10. The information processing apparatus according to claim 8, wherein the first image data includes a start-up image, and the second image data includes a start-up image.

11. The information processing apparatus according to claim 8, wherein the image capture device includes a camera.

12. A method comprising:
    causing an information processing apparatus to communicate with an external device including a camera, wherein the information processing apparatus includes a first storage unit that stores first image data related to a first theme, and the external device includes a second storage unit that stores second image data related to a second theme;

causing the information processing apparatus to detect the second image data stored in the second storage unit; and causing the information processing apparatus display, on a same display screen, first information corresponding to the first image data stored in the storage unit, second information corresponding to the second image data stored in the second storage unit, and a button for requesting the information processing apparatus to transmit the first image data stored in the first storage unit to the external device, wherein the first image data stored in the first storage unit is stored in the second storage unit, instead of the second image data stored in the second storage unit, if the button is displayed on the same screen is operated.

13. A method comprising:

causing an information processing apparatus to communicate with an image capture device, wherein the information processing apparatus includes a first storage unit that stores first image data, and the image capture device includes a second storage unit that stores second image data; and causing the information processing apparatus to display, on a same display screen, first information corresponding to the first image data stored in the first storage unit, second information corresponding to the second image data stored in the second storage unit, and a button for requesting the information processing apparatus to transmit the first image data stored in the first storage unit to the image capture device, wherein the first image data stored in the first storage unit is stored in the second storage unit, instead of the second image data stored in the second storage unit, if the button displayed on the same screen is operated.

14. The method according to claim 13, further comprising causing the information processing apparatus to display, on the same screen, another button for requesting the information processing apparatus to display an image corresponding to the second image data stored in the second storage unit.

15. The method according to claim 13, wherein the first image data is related to a first theme, and the second image data is related to a second theme.

16. The method according to claim 13, wherein the first image data includes a start-up image, and the second image data includes a start-up image.

17. The method according to claim 13, wherein the image capture device includes a camera.

18. A method comprising:

causing an information processing apparatus to communicate with an image capture device, wherein the information processing apparatus includes a first storage unit that stores first image data related to a first theme, and the image capture device includes a second storage unit that stores second image data related to a second theme; and causing the information processing apparatus to display, on a same display screen, first information corresponding to the first theme, second information corresponding to the second theme, and a button for requesting the information processing apparatus to transmit the first image data related to the first theme to the image capture device, wherein the first image data stored in the first storage unit is stored in the second storage unit, instead of the second image data stored in the second storage unit, if the button displayed on the same screen is operated.

19. The method according to claim 18, wherein the first image data includes a start-up image, and the second image data includes a start-up image.

20. The method according to claim 18, wherein the image capture device includes a camera.

21. A non-transitory computer-readable storage medium storing a program which causes a computer to execute a method, the method comprising:

causing an information processing apparatus to communicate with an external device including a camera, wherein the information processing apparatus includes a first storage unit that stores first image data related to a first theme, and the external device includes a second storage unit that stores second image data related to a second theme;

causing the information processing apparatus to detect the second image data stored in the second storage unit; and causing the information processing apparatus to display, on a same display screen, first information corresponding to the first image data stored in the first storage unit, second information corresponding to the second image data stored in the second storage unit, and a button for requesting the information processing apparatus to transmit the first image data stored in the first storage unit to the external device, wherein the first image data stored in the first storage unit is stored in the second storage unit, instead of the second image data stored in the second storage unit, if the button displayed on the same screen is operated.

22. A non-transitory computer-readable storage medium storing a program which causes a computer to execute a method, the method comprising:

causing an information processing apparatus to communicate with an image capture device, wherein the information processing apparatus includes a first storage unit that stores first image data, and the image capture device includes a second storage unit that stores second image data; and causing the information processing apparatus to display, on a same display screen, first information corresponding to the first image data stored in the first storage unit, second information corresponding to the second image data stored in the second storage unit, and a button for requesting the information processing apparatus to transmit the first image data stored in the first storage unit to the image capture device, wherein the first image data stored in the first storage unit is stored in the second storage unit, instead of the second image data stored in the second storage unit, if the button displayed on the same screen is operated.

23. The non-transitory computer-readable storage medium according to claim 22, the method further comprising causing the information processing apparatus to display, on the same screen, another button for requesting the information processing apparatus to display an image corresponding to the second image data stored in the second storage unit.

24. The non-transitory computer-readable storage medium according to claim 22, wherein the first image data is related to a first theme, and the second image data is related to a second theme.

25. The non-transitory computer-readable storage medium according to claim 22, wherein the first image data includes a start-up image, and the second image data includes a start-up image.

26. The non-transitory computer-readable storage medium according to claim 22, wherein the image capture device includes a camera.

27. A non-transitory computer-readable storage medium storing a program which causes a computer to execute a method, the method comprising:
   causing an information processing apparatus to communicate with an image capture device, wherein the information processing apparatus includes a first storage unit that stores first image data related to a first theme, and the image capture device includes a second storage unit that stores second image data related to a second theme; and
   causing the information processing apparatus to display, on a same display screen, first information corresponding to the first theme, second information corresponding to the second theme, and a button for requesting the information processing apparatus to transmit the first image data related to the first theme to the image capture device,
   wherein the first image data stored in the first storage unit is stored in the second storage unit, instead of the second image data stored in the second storage unit, if the button displayed on the same screen is operated.

28. The non-transitory computer-readable storage medium according to claim 27, wherein the first image data includes a start-up image, and the second image data includes a start-up image.

29. The non-transitory computer-readable storage medium according to claim 27, wherein the image capture device includes a camera.

30. An information processing apparatus comprising:
   a first storage unit that stores first image data related to a first theme and first sound data related to the first theme;
   a communication unit that communicates with an image capture device, wherein the image capture device includes a second storage unit that stores second image data related to a second theme and second sound data related to the second theme; and
   a control unit that causes the information processing apparatus to display, on a same display screen, first information corresponding to the first theme, second information corresponding to the second theme, and a button for requesting the information processing apparatus to transmit the first image data related to the first theme and the first sound data related to the first theme to the image capture device,
   wherein the first image data and the first sound data are stored in the second storage unit, instead of the second image data and the second sound data stored in the second storage unit, if the button displayed on the same screen is operated.

31. The information processing apparatus according to claim 30, wherein the control unit causes the information processing apparatus to display, on the same screen, another button for requesting the information processing apparatus to display an image corresponding to the second image data stored in the second storage unit.

32. The information processing apparatus according to claim 30, wherein the first image data includes a start-up image, and the second image data includes a start-up image.

33. The information processing apparatus according to claim 30, wherein the image capture device includes a camera.

34. A method comprising:
   causing an information processing apparatus to communicate with an image capture device, wherein the information processing apparatus includes a first storage unit that stores first image data related to a first theme and first sound data related to the first theme, and the image capture device includes a second storage unit that stores second image data related to a second theme and second sound data related to the second theme; and
   causing the information processing apparatus to display, on a same display screen, first information corresponding to the first theme, second information corresponding to the second theme, and a button for requesting the information processing apparatus to transmit the first image data related to the first theme and the first sound data related to the first theme to the image capture device,
   wherein the first image data and the first sound data stored in the first storage unit are stored in the second storage unit, instead of the second image data and the second sound data stored in the second storage unit, if the button displayed on the same screen is operated.

35. The method according to claim 34, wherein the first image data includes a start-up image, and the second image data includes a start-up image.

36. The method according to claim 34, wherein the image capture device includes a camera.

37. A non-transitory computer-readable storage medium storing a program which causes a computer to execute a method, the method comprising:
   causing an information processing apparatus to communicate with an image capture device, wherein the information processing apparatus includes a first storage unit that stores first image data related to a first theme and first sound data related to the first theme, and the image capture device includes a second storage unit that stores second image data related to a second theme and second sound data related to the second theme; and
   causing the information processing apparatus to display, on a same display screen, first information corresponding to the first theme, second information corresponding to the second theme, and a button for requesting the information processing apparatus to transmit the first image data related to the first theme and the first sound data related to the first theme to the image capture device,
   wherein the first image data and the first sound data stored in the first storage unit are stored in the second storage unit, instead of the second image data and the second sound data stored in the second storage unit, if the button displayed on the same screen is operated.

38. The non-transitory computer-readable storage medium according to claim 37, wherein the first image data includes a start-up image, and the second image data includes a start-up image.

39. The non-transitory computer-readable storage medium according to claim 37, wherein the image capture device includes a camera.

40. An information processing apparatus comprising:
   a first storage unit that stores first sound data;
   a communication unit that communicates with an image capture device, wherein the image capture device includes a second storage unit that stores second sound data; and
   a control unit that causes the information processing apparatus to display, on a same display screen, first information corresponding to the first sound data stored in the first storage unit, second information corresponding to the second sound data stored in the second storage unit, and a button for requesting the information processing apparatus to transmit the first sound data stored in the first storage unit to the image capture device, wherein the first sound data stored in the first storage unit is stored in the second storage unit, instead of the second sound data stored in the second storage unit, if the button displayed on the same screen is operated.

41. The information processing apparatus according to claim 40, wherein the control unit causes the information processing apparatus to display, on the same screen, another button for requesting the information processing apparatus to reproduce the second sound data stored in the second storage unit.

42. The information processing apparatus according to claim 40, wherein the first sound data is related to a first theme, and the second sound data is related to a second theme.

43. The information processing apparatus according to claim 40, wherein the first sound data includes one of a start-up sound, a shutter sound, an operation sound, and a self-timer sound, and the second sound data includes one of a start-up sound, a shutter sound, an operation sound, and a self-timer sound.

44. The information processing apparatus according to claim 40, wherein the image capture device includes a camera.

45. A method comprising:

causing an information processing apparatus to communicate with an image capture device, wherein the information processing apparatus includes a first storage unit that stores first sound data, and the image capture device includes a second storage unit that stores second sound data; and causing the information processing apparatus to display, on a same display screen, first information corresponding to the first sound data stored in the first storage unit, second information corresponding to the second sound data stored in the second storage unit, and a button for requesting the information processing apparatus to transmit the first sound data stored in the first storage unit to the image capture device, wherein the first sound data stored in the first storage unit is stored in the second storage unit, instead of the second sound data stored in the second storage unit, if the button displayed on the same screen is operated.

46. The method according to claim 45, further comprising causing the information processing apparatus to display, on the same screen, another button for requesting the information processing apparatus to reproduce the second sound data stored in the second storage unit.

47. The method according to claim 45, wherein the first sound data is related to a first theme, and the second sound data is related to a second theme.

48. The method according to claim 45, wherein the first sound data includes one of a start-up sound, a shutter sound, an operation sound, and a self-timer sound, and the second sound data includes one of a start-up sound, a shutter sound, an operation sound, and a self-timer sound.

49. The method according to claim 45, wherein the image capture device includes a camera.

50. A non-transitory computer-readable storage medium storing a program which causes a computer to execute a method, the method comprising:

causing an information processing apparatus to communicate with an image capture device, wherein the information processing apparatus includes a first storage unit that stores first sound data, and the image capture device includes a second storage unit that stores second sound data; and causing the information processing apparatus to display, on a same display screen, first information corresponding to the first sound data stored in the first storage unit, second information corresponding to the second sound data stored in the second storage unit, and a button for requesting the information processing apparatus to transmit the first sound data stored in the first storage unit to the image capture device, wherein the first sound data stored in the first storage unit is stored in the second storage unit, instead of the second sound data stored in the second storage unit, if the button displayed on the same screen is operated.

51. The non-transitory computer-readable storage medium according to claim 50, the method further comprising causing the information processing apparatus to display, on the same screen, another button for requesting the information processing apparatus to reproduce the second sound data stored in the second storage unit.

52. The non-transitory computer-readable storage medium according to claim 50, wherein the first sound data is related to a first theme, and the second sound data is related to a second theme.

53. The non-transitory computer-readable storage medium according to claim 50, wherein the first sound data includes one of a start-up sound, a shutter sound, an operation sound, and a self-timer sound, and the second sound data includes one of a start-up sound, a shutter sound, an operation sound, and a self-timer sound.

54. The non-transitory computer-readable storage medium according to claim 50, wherein the image capture device includes a camera.

* * * * *